United States Patent

Klaas et al.

[11] Patent Number: 5,850,695
[45] Date of Patent: Dec. 22, 1998

[54] ONE-PIECE HOLLOW CAMSHAFTS AND PROCESS FOR PRODUCING SAME

[75] Inventors: Friedrich Klaas; Helmut Bogel, both of Aalen, Germany

[73] Assignee: Cosma International Inc., Aurora, Canada

[21] Appl. No.: 648,072

[22] PCT Filed: Oct. 14, 1994

[86] PCT No.: PCT/DE94/01218

§ 371 Date: Jul. 12, 1996

§ 102(e) Date: Jul. 12, 1996

[87] PCT Pub. No.: WO95/14851

PCT Pub. Date: Jun. 1, 1995

[30] Foreign Application Priority Data

Nov. 26, 1993 [DE] Germany ............... 43 40 399.9
Aug. 1, 1994 [DE] Germany ............... 44 27 201.4

[51] Int. Cl.⁶ .................................................. C21C 7/04
[52] U.S. Cl. ............................. 29/888.1; 74/567; 29/525
[58] Field of Search .................. 74/567; 29/888.1, 29/523, 522.1, 525; 123/90.34, 90.6

[56] References Cited

U.S. PATENT DOCUMENTS

| | | | |
|---|---|---|---|
| 2,202,330 | 5/1940 | Brock et al. .......................... | 74/567 |
| 2,892,254 | 6/1959 | Garvin . | |
| 3,845,667 | 11/1974 | Honrath et al. . | |
| 4,644,912 | 2/1987 | Umeha et al. .................. | 74/567 X |
| 4,660,269 | 4/1987 | Suzuki . | |
| 4,730,474 | 3/1988 | Iwakura et al. . | |
| 4,783,898 | 11/1988 | Kanamaru et al. ............... | 29/522.1 |
| 4,798,178 | 1/1989 | Greulich et al. ................ | 123/90.6 |
| 4,840,053 | 6/1989 | Nakamura . | |
| 4,949,683 | 8/1990 | Swars ................................ | 74/567 X |
| 5,040,294 | 8/1991 | Harle . | |
| 5,041,253 | 8/1991 | Husted .......................... | 29/888.1 X |
| 5,201,246 | 4/1993 | Arnold et al. ..................... | 74/567 |

(List continued on next page.)

FOREIGN PATENT DOCUMENTS

497438A1 1/1992 European Pat. Off. .
4007284A1 3/1991 Germany .

OTHER PUBLICATIONS

Industrieanzeiger [Industrial Journal] No. 20, Mar. 9, 1984, "Hohlteile Material —Sparend hergestellt" [Hollow Parts Produced in a Material Saving Manner].

"Materialumformatechik" [Materials Shaping Technology], vol. 1D/91, pp. 15 et seq.: A. Ebbinghaus Prazisionswerkestucke in Leichtbauweise, hergestellt durch Innenhochdruckumformen [Precision Workpieces in Lightweight Construction, Produced by Internal High Pressure Shaping].

"Werkstoff und Betrieb" [Material and Factory] 123 (1990), 3, pp. 241–243: A. Ebbinghaus, Wirtschaftliches Konstruieren mit innenhochdruckgeformten Prazisionswerkstucken [Economical Construction by Means of Precision Workpieces Produced by Internal High Pressure Shaping].

*Primary Examiner*—Vinh T. Luong
*Attorney, Agent, or Firm*—Pillsbury Madison & Sutro Cushman Darby & Cushman Intellectual Property Group

[57] ABSTRACT

A method for producing a hollow camshaft comprising i) forming a camshaft preform by providing a hollow metal pipe, expanding the hollow pipe at spaced longitudinal locations by applying pressurized fluid internally to the hollow pipe, axially compressing the hollow pipe during the expanding step to accumulate metal at the spaced longitudinal locations, the expanding and compressing steps forming a camshaft preform having cam preforms of associated predetermined widths in a longitudinal pipe direction; and ii) forming a final camshaft from the camshaft preform by axially compressing the camshaft preform while applying the pressurized fluid to reduce the predetermined widths of the cam preforms while shaping the camshaft preforms into the final camshaft, the final camshaft having cams of relatively smaller widths in the longitudinal direction than the predetermined widths of the cam preforms.

14 Claims, 3 Drawing Sheets

U.S. PATENT DOCUMENTS

| | | | |
|---|---|---|---|
| 5,205,187 | 4/1993 | Ebbinghaus . | |
| 5,259,268 | 11/1993 | Ebbinghaus | 74/567 |
| 5,263,249 | 11/1993 | Kaywood | 29/888.1 |
| 5,348,210 | 9/1994 | Linzell | 29/525 X |
| 5,450,665 | 9/1995 | Madono et al. | 29/888.1 |

OTHER PUBLICATIONS

"Werkstoff and Betrieb" [Material and Factory] 122, 11, (1989) pp. 933–938: A. Ebbinghaus Gesenkschmiede mit neuer Technologie [Die–Forging With New Technology].

PRE-FORM
1st SHAPING STEP

FINISHED FORM
2nd SHAPING STEP

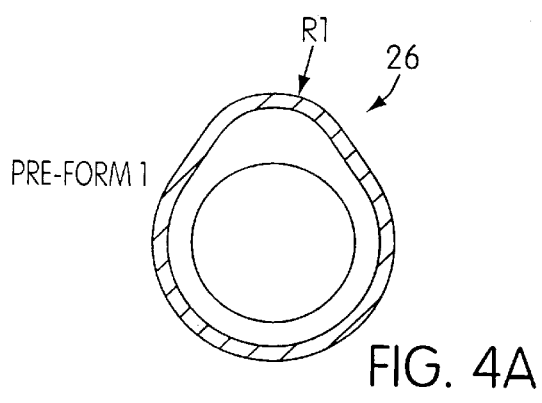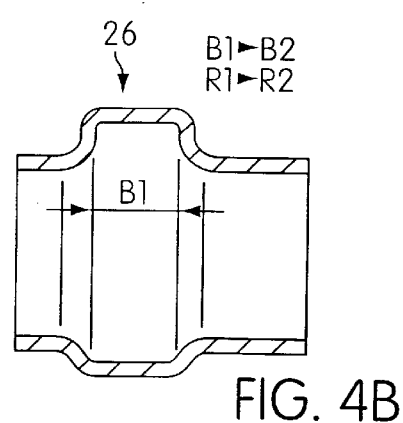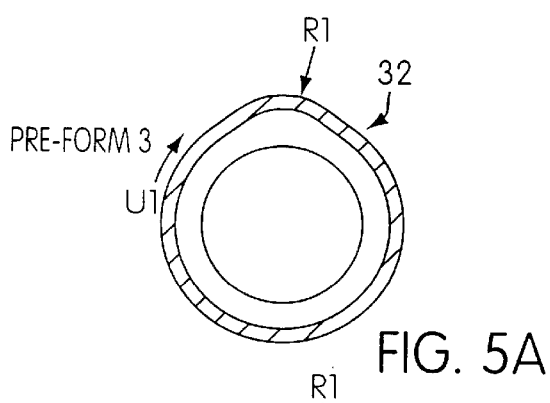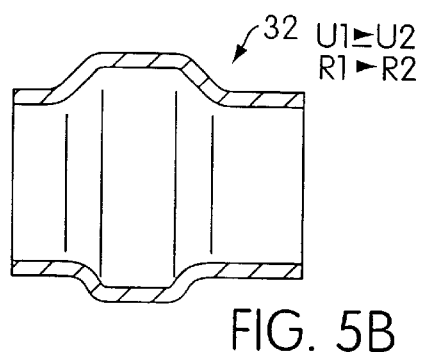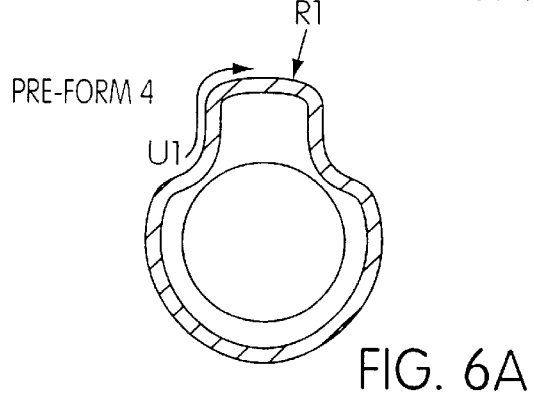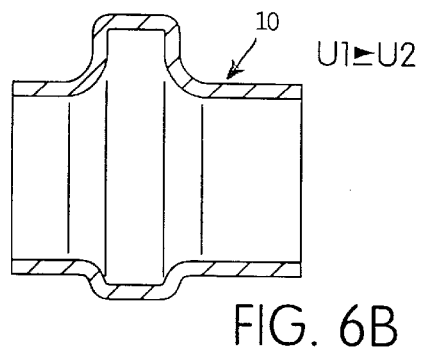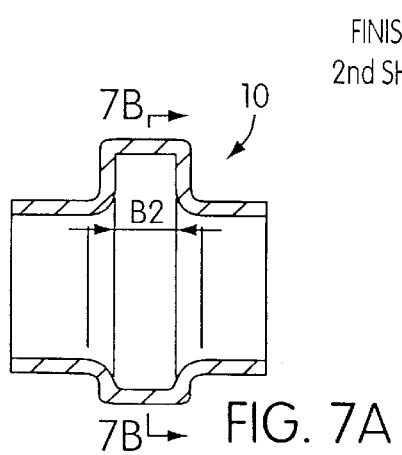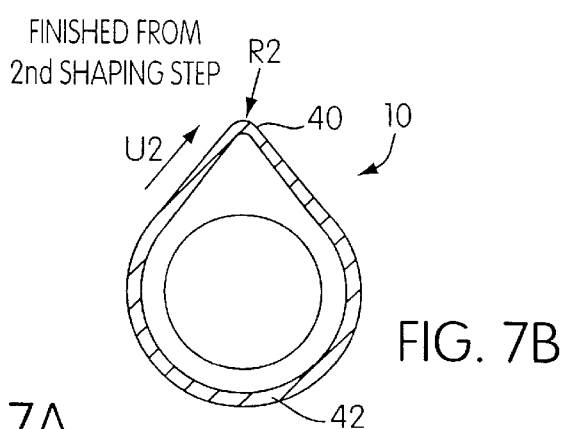

ONE-PIECE HOLLOW CAMSHAFTS AND PROCESS FOR PRODUCING SAME

This application claims benefit of international application PCT/DE 94/01213, filed Oct. 14, 1994.

BACKGROUND OF THE INVENTION

The invention relates to a hollow camshaft as well as a process for producing hollow camshafts by employing internal high pressure shaping of hollow pipes.

The invention in particular relates to processes employing pre-shaping in the course of internal high pressure shaping for designing complete hollow shafts from pipe sections, wherein pipe sections are here understood to be arbitrary long hollow bodies, i.e. also square pipes, hexagonal pipes or other hollow profiles.

In comparison with solid hollow shafts, hollow camshafts, such as schematically represented in FIG. 1, offer a weight advantage of up to 75% over shafts of solid material. In comparison to this, constructed camshafts such as known from DE-37 04 092, EP 278292, DE-3428372 or EP 290758 or EP 303845, only offer a weight advantage of 40% in comparison with solid shafts. In addition, constructed camshafts are comparatively expensive to produce, because separate cams and hollow pipes must be stocked and then placed together in a die in a suitable manner. Thus, expensive individual components must be kept in stock and combined.

For this reason hollow camshafts, although their constructed shape has been described theoretically and also in patent applications, have not yet been used in motor vehicles up to now.

The reason for this lies in a suitable process technique for producing these shafts.

Suggestions for producing constructed hollow camshafts are recited, for example, in DE-19 10 517. These process techniques are, however, completely unusable for producing hollow camshafts from pipe sections. The required degrees of shaping can not be achieved by electromagnetic or by electro-hydraulic shaping. Swaging or round kneading as described in DE-37 36 453 also has not met the goal. This method of producing hollow camshafts fails particularly because of the one-sided mass distribution in the cams. The one-step internal high pressure shaping by means of a tool in accordance with U.S. Pat. NO. 2,892,254 also does not meet the goal. Although axial feeding of material is provided with this mode of operation, filling the die at the cam tips is not achieved and a considerable stretching of the walls of the cams results. FIG. 2 shows the undesired stretching of the walls on a cam which was produced by means of the known one-step internal high pressure shaping method.

The internal high pressure method or IHV method is here understood to mean the method which was described for example in the Industrieanzeiger [Industrial Journal] No. 20 of Mar. 9, 1984, Hohlteile Material-Sparend hergestellt" [Hollow Parts Produced in a Material Saving Manner] or in "Materialumformtechik"[Material Shaping Technology], vol. ID/91, pp. 15 et seq.: A. Ebbinghaus "Prazisionswerkstucke in Leichtbauweise, hergestellit durch Innenhochdruckumformen"[Precision Workpieces in Lightweight Construction, Produced by Internal High Pressure Shaping], or in "Werkstoff und Betrieb"[Material and Factory]123 (1990), 3, pp. 241 to 243: A. Ebbinghaus "Wirtschaftliches Konstruieren mit innenhochdruckgeformten Prazisionswerkstucken"[Economical Construction by Means of Precision Workpieces Produced by Internal High Pressure Shaping], or "Werkstoff und Betrieb"122, 11, (1989), pp. 933 to 938: A. Ebbinghaus "Gesenkschmiede mit neuer Technologie"[Die-Forging With New Technology]. To avoid repetition, reference is made in full to their disclosure in what follows.

These processes have been used up to now for example for producing flanges, as described in EP-2395052, or for producing constructed hollow camshafts for fastening cams on a pipe for producing hollow camshafts.

SUMMARY OF THE INVENTION

In contrast to this it is the object of the invention to provide a hollow camshaft which can be economically produced, and a process for manufacturing it.

This object is attained by means of a one-piece camshaft consisting of metal or plastic which can be cold-shaped and heat-treated and has a flow of fibers which is parallel to the outer contours of the camshaft.

Carbon-containing steel, which can be sufficiently stretched, but can also be heat-treated for hardening, can preferably be used as the material for this.

Suitable materials can be: 19MnB4, 16MnCr5, CK45, 19CrKo44, 15Cr3, C25-steel, X3NiCoMoTilB 9 5, β-C-titanium alloys and those showing similar properties.

The invention furthermore relates to a method for producing hollow shafts, employing the internal high pressure shaping of hollow pipes, distinguished by the following steps:

Placing a pipe outlet element and filling it with fluid;

Sealing at least the pipe section to be widened;

Applying an internal high pressure suitable for widening the pipe section to produce an intermediate product preform, wherein, while the internal high pressure is applied, the hollow pipe is compressed against a movable die in the direction of its long axis in such a way that accumulations of material occur at approximately those places where it is intended to create cams; and Shaping the intermediate product preform into a shape corresponding to a final camshaft shape by means of the internal high pressure shaping method, so that cams are shaped at the desired locations; if necessary, finishing the cams by heat-treatment or the like.

Other advantages will be appreciated from the following disclosure and claims.

Thus, proceeding beyond the known internal high pressure shaping method (see "Tagungsband des 14. umformtechnischen Kolloquiums"[Minutes of the 14th Colloquium on Shaping Technology] in Hannover 1993, for the disclosure of which reference is made in full), in accordance with the invention a special two-step shaping method is provided, by means of which hollow camshafts can be economically produced. In the process, exactness of shape and low wall stretching at the cam tips is achieved in an appropriate internal high pressure shaping method.

In a surprising manner it is possible to produce camshafts having essentially constant wall thickness.

The invention will be explained in detail below, making use of the attached drawings and the subsequent description.

BRIEF DESCRIPTION OF THE DRAWINGS

FIG. 4A is a cross-sectional view of a cam preform after a first shaping step;

FIG. 4B is a partial longitudinal sectional view of the cam preform shown in FIG. 4A;

FIG. 5A is a cross-sectional view of a second cam preform after a first shaping step;

FIG. 5B is partial longitudinal sectional view of the cam perform is shown in FIG. 5A;

FIG. 6A is a cross-sectional view of a third cam preform after a first shaping step;

FIG. 6B is a partial longitudinal sectional view of the cam preform in shown in FIG. 6A;

FIG. 7A is an enlarged cross-sectional view of a portion of the final cam shown in FIG. 1, and produced from the preforms shown in FIGS. 4 to 6;

FIG. 7B is a partial longitudinal sectional view of the final cam shown in FIG. 7A.

DETAILED DESCRIPTION OF THE INVENTION

Figure 1:
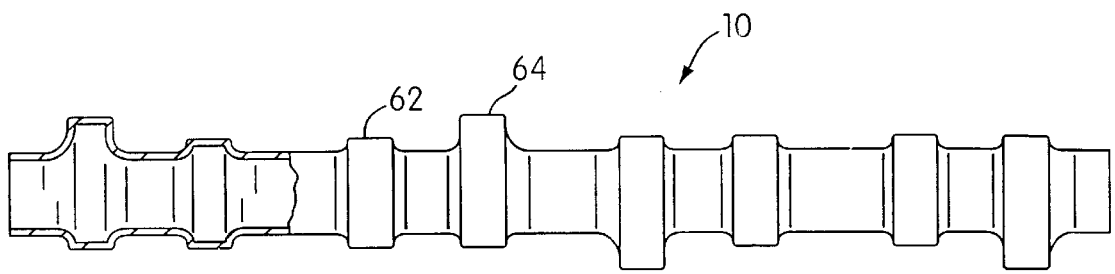
FIG. 1 is a schematic representation of a camshaft in accordance with the invention, produced in two shaping steps.

A camshaft in accordance with the invention, generally indicated at 10 in FIG. 1, is distinguished in that, in contrast to conventionally constructed hollow camshafts, it does not have attached cams, but is produced from a single original pipe without any further individual elements in several shaping steps. As a result, there is an extremely advantageous fiber flow extending parallel to the outer contours of the shaft, which results in great sturdiness of the shaft and thus in reduced weight. If desired, it is possible at the same time to set an essentially constant wall thickness of 2 mm to 5 mm, for example, which has a tolerance of only approximately 0.5 mm.

As shown in FIG. 1, a hollow tube has been expanded at spaced longitudinal locations 62, 64 to form the hollow camshaft in accordance with the invention.

No problems of a possible detachment of the cams from the central pipe occur. It is important that a material is used which has sufficient cold-forming capability while at the same time has hardness or the capability of being hardened in order to create wear-resistant cams.

This can be, for example, suitable carbon-containing steel which can be heat-treated but also is sufficiently stretchable for tolerating such extensive shaping without tearing. Depending on the intended use of the shaft in stationary engines, aircraft engines, ship's engines or land vehicles, it is of course possible to employ other light and/or sturdy materials, such as aluminum alloys, titanium alloys and other materials familiar to one skilled in the art, such as 19MNB4, 16MnCr5, CK45, 19CrKo44, 15Cr3, C25-steel, X3NiCoMoTilB 9 5, β-C-titanium alloys and those showing similar properties. Depending on the intended use it is possible to employ an expensive, light material—this is suggested for example for aircraft engine construction—or a heavier material if weight is not an essential consideration, such as for ship's engines.

The method in accordance with the invention preferably provides at least a two-step shaping process consisting of preform and finished form, wherein particular importance is assigned to the preform in the first shaping step. So that exactness of shape and little wall stretching are assured to the finished form in the second shaping step, it is necessary to provide an advantageous mass distribution of the cam wall in the preform. In each case the mass distribution can only be achieved if the material is being axially pushed longitudinally inwards on opposite sides of each cam by a movable die. The axial feeding at each cam is performed by means of tool technology known per se.

Figure 2A:
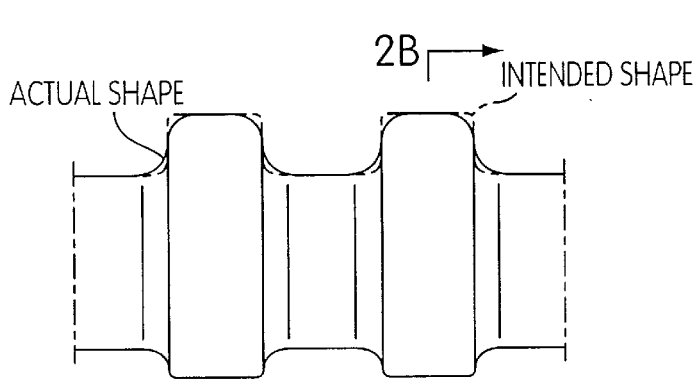
FIG. 2A is a schematic representation of a camshaft produced in a single shaping step in accordance with the prior art.
Figure 2B:
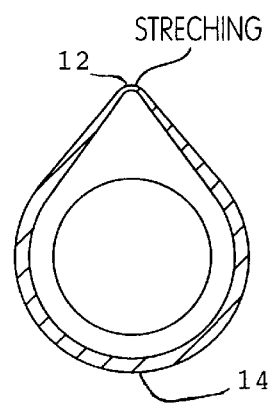
FIG. 2B is a section along the line 2B—2B of FIG. 2A.

FIG. 2B shows a section through a hollow camshaft formed by means of a single shaping step in accordance with the prior art, and it can be seen particularly from the cross section of the cam in FIG. 2B that stretching of the metal in the one-step method is too high and that considerable differences in wall thickness occur, namely a wall thickness of approximately 1.0 mm at the cam tip 12 and of 3.0 mm on the pipe wall 14 opposite the cam tip. Because of this, sturdiness is not assured.

Figure 3A:
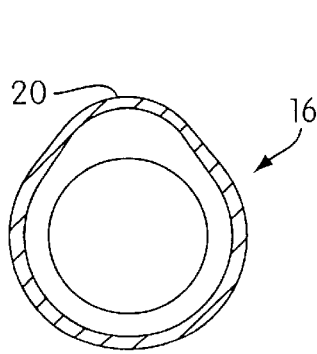
FIG. 3A is a section through a cam preform made in accordance with the invention.
Figure 3B:
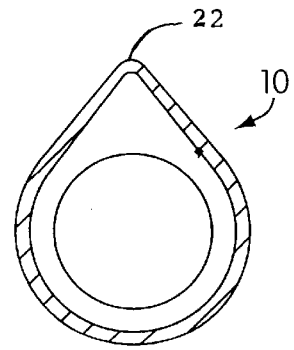
FIG. 3B is a section through the final form of the cam created from the preform of FIG. 3A.

In contrast to this, a cam as produced in accordance with the method of the present invention is first formed into a preform 16, as shown generally in FIG. 3A. It can be appreciated that the cam preform illustrated in FIG. 3A has relatively rounded tip ends 20 in comparison with the relatively pointed cam tip ends 22 in the final camshaft, as shown in FIG. 3B. Because initially a cam is produced into the preform 16 which is wider, preferably approximately 10 to 40% wider and particularly preferred approximately 20 to 30% wider than the finished camshaft form 10, as shown generally in FIG. 3B, and is also more round than the finished form 10, it is possible to provide in the preform 16 a sufficient accumulation of material at the critical cam location 20 where maximum material stretching takes place. This accumulation of material can then in a second shaping step be shaped into the finished cam form 10, for example by means of an internal high pressure shaping method. However, if desired, other shaping methods, such as swaging, can also be employed. It can be seen that for the finished camshaft 10, the desired accumulation of material under the cam 22 can be achieved by means of two shaping steps.

In the embodiment shown in FIG. 4A, for example, the cam preform 26 has round cam tips R1 in order to prevent unnecessary material stretching. The cam preform width B1, as shown in FIG. 4B, is wider by 10 to 40%, preferably 20 to 30%, than the finished form width B2, as shown in FIG. 7A. In the course of shaping the finished form, the round and ready preform 26 is axially compressed in the second shaping step, resulting in the finished camshaft 10 illustrated in FIGS. 7A and 7B. This compressing process prevents the excessive stretching of the pipe wall and forces a high degree of shape accuracy, which makes late finishing unnecessary.

FIGS. 5A and 5B show another possible preform variant indicated at 32, for the first shaping step, with a directedly increased circumference U1 of the cams in the preform which is approximately 5 to 20% greater, preferably 10% greater than the finished form. In this case the material flows in the circumferential direction U2 into the cam tip in the course of producing the finished form. In this connection reference is made to FIGS. 6A and 6B showing a partially collapsed cam shape which then is shaped into a cam in a subsequent shaping step.

The finished cam shape is then represented in FIGS. 7A and 7B and can be produced from every one of the preforms of FIGS. 4A, 5A and 6A. In one embodiment—to which the invention is not limited in any way—the exterior cam height is 50 mm from the cam tip 40 to the cam base 42; the pipe section has a diameter of 30 mm and a wall thickness of approximately 3 mm, the cam tip 40 has a wall thickness of 2 to 3 mm and the cam base 42 has a wall thickness of up to 5 mm, since the greatest accumulation of material takes place there. The cam preforms of FIGS. 4A, 5A, and 6A and finished forms represented in these figures (e.g., FIG. 7A and 7B) are of course not limiting. If required, it is also possible to form bearing rings and the like on the camshaft 10 in accordance with this principle.

Figure 8:
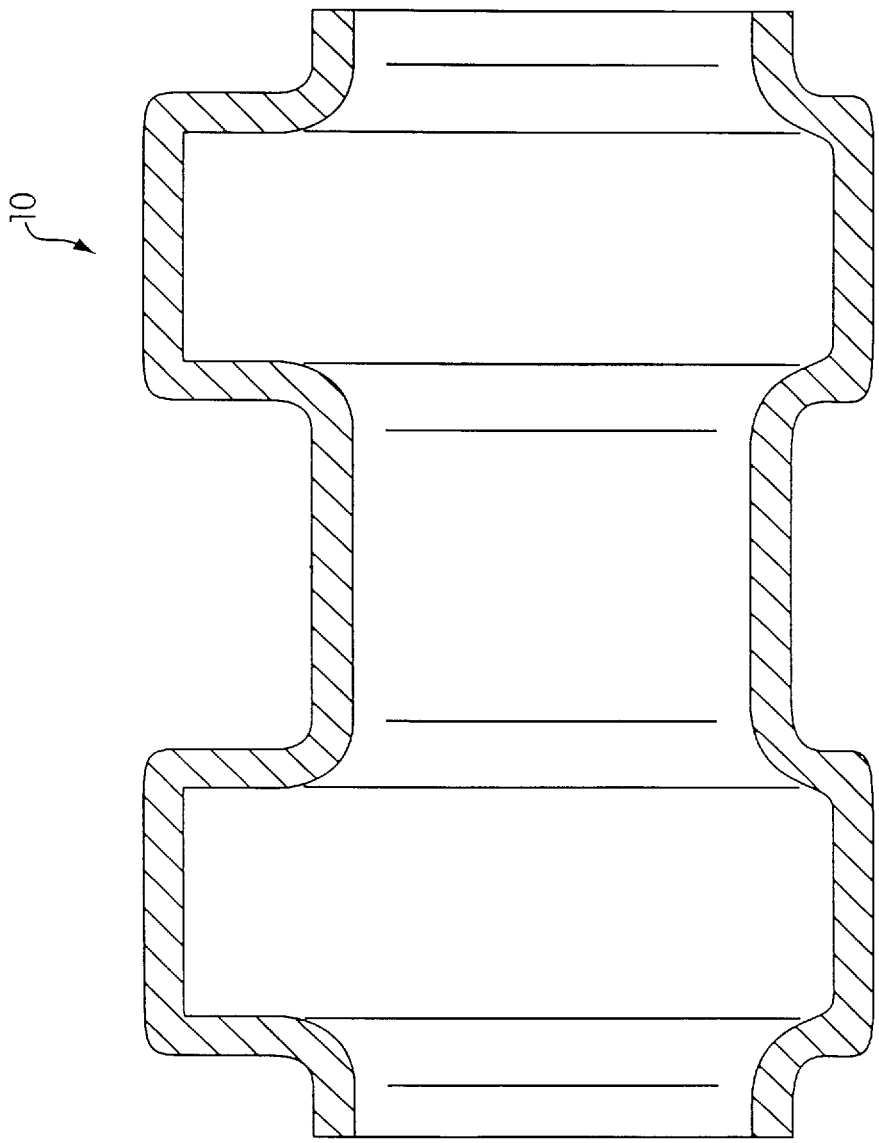
FIG. 8 is partial longitudinal sectional view of a final cam shaft manufactured in accordance with the present invention.

FIG. 8 is a cross-sectional view of the camshaft 10 of the invention. In accordance with the present invention, the camshaft 10 has fibers that extend parallel with respect to the walls of the camshaft.

Finally, the possibility of a combination of internal high pressure shaping-methods and other shaping methods should be mentioned. A suitable preform can be produced, for example, by means of internal high pressure shaping and can be subsequently finished by swaging or other suitable methods familiar to one skilled in the art.

The shaft can be further processed in accordance with the IHV method in a known manner. For example, the shaft can be hardened. Useful for this are the known processes, such as finishing of the shaft by means of one or several finishing methods selected from the group comprising nitrocarbonizing, plasma-nitriding, treating with boron, laser hardening, hardening without carbonizing, induction hardening, flame hardening, electron-beam hardening and case hardening.

It is pointed out that the shafts in accordance with the invention can be produced by means of the IHV method with the most varied cam angles, wall thickness, wall thickness ratios and are in no way limited to any one of the described embodiments.

We claim:

1. A method for producing a hollow camshaft comprising:
   i) forming a camshaft preform having cam preforms of respective widths in a longitudinal pipe direction by:
      providing a hollow metal pipe;
      expanding a diameter of said hollow pipe at spaced longitudinal locations by applying pressurized fluid internally to said hollow pipe;
      axially compressing said hollow pipe during said expanding step to accumulate metal at said spaced longitudinal locations; and
   ii) forming said hollow camshaft from said camshaft preform by:
      axially compressing said camshaft preform while applying said pressurized fluid to reduce the predetermined widths of said cam preforms while shaping said camshaft preform into the hollow camshaft, said hollow camshaft having cams of smaller widths in the longitudinal direction than the widths of said cam preforms.

2. The method according to claim 1, wherein said predetermined widths of said cam preforms are between 10% to 40% greater than the widths of the cams of the final camshaft.

3. The method according to claim 2, wherein said cam preforms have rounded tip ends, and said method further comprises a step of forming cam tip ends which are more pointed in comparison to said rounded tip ends.

4. The method according to claim 3, wherein said final camshaft is hardened using a method selected from the group comprising: nitrocarbonizing, plasma-nitriding, boron treatment, laser hardening, induction hardening, heat treatment, electron beam hardening and case hardening.

5. The method according to claim 1, wherein said predetermined widths of said cam preforms are between 20% to 30% greater than the widths of cams of said final camshaft.

6. The method according to claim 5, wherein said cam preforms have rounded tip ends, and said method further comprises a step of forming cam tip ends which are more pointed in comparison to said rounded tip ends.

7. The method according to claim 1, further comprising the step of axially pushing on both sides of each of said cam preforms.

8. A method for producing a hollow camshaft comprising:
   i) forming a camshaft preform having a plurality of cam preforms of respective predetermined circumferences by:
      providing a hollow metal pipe;
      applying pressurized fluid internally to said hollow metal pipe to expand a diameter of said hollow pipe at spaced longitudinal locations;
      axially compressing said hollow pipe while applying said pressurized fluid to accumulate metal at said spaced longitudinal locations; and
   ii) forming said hollow camshaft from said camshaft preform by:
      axially compressing said camshaft preform and applying pressurized fluid internally to said camshaft preform so as to shape said camshaft preform into said hollow camshaft,
      reducing the circumference of said cam preforms during said axially compressing step so as to form said hollow camshaft with cams of a final circumference less than said predetermined circumference.

9. The method according to claim 8, wherein said predetermined circumference is between 5% and 20% greater than said final circumference.

10. The method according to claim 9, wherein said predetermined circumference is 10% greater than said final circumference.

11. The method according to claim 10, wherein said cam performs have rounded tip, ends and said method further comprises a step of forming cam tips ends which are more pointed in comparison to said rounded tip ends.

12. The method according to claim 8, wherein said cam preforms have rounded tip ends, and said method further comprises a step of forming cam tip ends which are more pointed in comparison to said rounded tip ends.

13. The method according to claim 8, wherein said final camshaft is hardened using a method selected from the group comprising: nitrocarbonizing, plasma-nitriding, boron treatment, laser hardening, induction hardening, heat treatment, electron beam hardening and case hardening.

14. The method according to claim 8, further comprising the step of axially pushing on both sides of each of said cam preforms.

* * * * *